April 23, 1963    G. P. FLAHERTY    3,086,684
SPREADER GATE ASSEMBLY
Original Filed Nov. 21, 1958    2 Sheets-Sheet 1

Gene P. Flaherty
INVENTOR.

BY *Clarence A. O'Brien*
*and Harvey B. Jacobson*
Attorneys

April 23, 1963 G. P. FLAHERTY 3,086,684
SPREADER GATE ASSEMBLY
Original Filed Nov. 21, 1958 2 Sheets-Sheet 2

Gene P. Flaherty
INVENTOR.

BY *Clarence A. O'Brien*
*and Harvey B. Jacobson*
Attorneys

United States Patent Office 3,086,684
Patented Apr. 23, 1963

3,086,684
SPREADER GATE ASSEMBLY
Gene P. Flaherty, Pocatello, Idaho, assignor to Koehring Company, Milwaukee, Wis., a corporation of Wisconsin
Continuation of application Ser. No. 775,488, Nov. 21, 1958. This application Mar. 12, 1962, Ser. No. 180,928
9 Claims. (Cl. 222—312)

This invention relates in general to new and useful improvements in chip spreading machines, and more specifically to a spreader gate assembly for the chip spreading hopper of a chip spreading machine.

In the spreading of mineral aggregates, such as chips, on roadway or other bitumen surfaces, it becomes necessary to accurately control the amount of chips deposited on the bitumen surface. This is the basic purpose for a chip spreading hopper, its gates and distribution roller. In addition to this control requirement, the operator of a chip spreading machine is also faced with the problem of varying the width of the application of the chips, this width never being constant from one job to another. In order to control the width of the swath of chips spread, numerous types of gates have been devised in the past. However, for one reason or another these gates have not proved satisfactory, primarily because they cannot be readily adjusted.

It is therefore the primary object of this invention to provide a spreader gate assembly for a chip spreader hopper wherein the individual gate members are so mounted whereby they may be rapidly adjusted so that the desired width or swath of chips spread may be quickly varied.

Another object of this invention is to provide an improved gate member for use on a chip distributing hopper of a chip spreading machine, the gate member having disposed along one side edge thereof an outwardly directed side flange, which flange will engage the side edge of the next adjacent gate member so that even when the next adjacent gate member is in an open position, there will be no space between the two adjacent gate members when one is open and the other is closed.

Another object of this invention is to provide a chip distributing hopper for chip distributing machines, the hopper including walls which serve to retain the chips within the hopper and which define a bottom opening, the bottom opening being partially closed by a distributing roller and being otherwise selectively closed by individual gate members, the individual gate members having inwardly curved lower parts curved in opposition to the direction of rotation of the roller which engage the distributing roller in tangential overlying relation to form a seal therewith and at the same time to slidably engage the gate members with the distributing roller to such that the distributing roll or roller may continue to rotate while the individual gate members are in their closed positions.

A further object of this invention is to provide a control device for controlling the opening and closing of individual gate members of a plural gate section distributing hopper, the control device including a main control shaft and a plurality of levers rotatably journaled thereon, there being one lever for each segmental gate, and the individual levers and the main control shaft having formed thereon latch means whereby the levers may be selectively locked to the main control shaft for rotation therewith.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
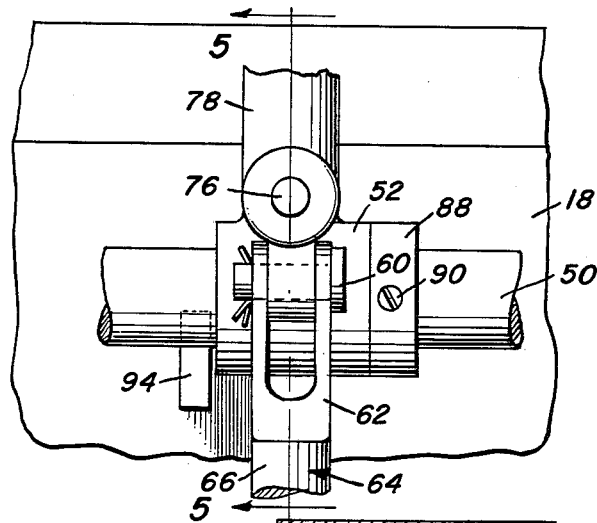
FIGURE 4 is an enlarged fragmentary elevational view of the upper part of the distributing hopper and shows the details of the control means for controlling the position of one of the segmental gates.
Figure 5:
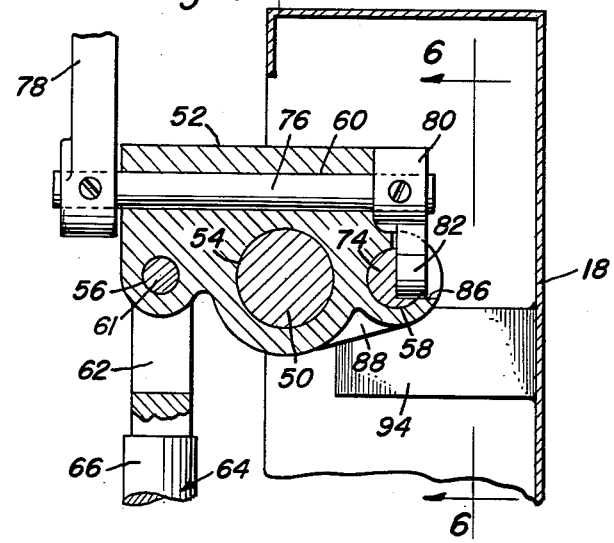
Figure 6:
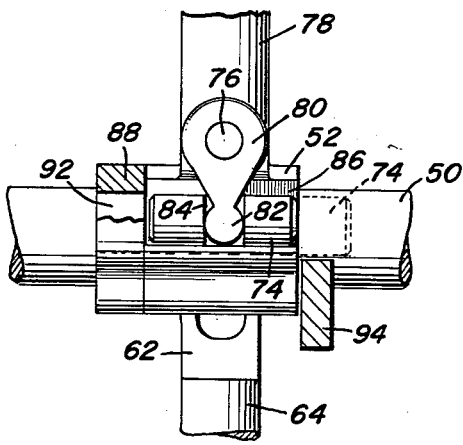

FIGURE 5 is an enlarged fragmentary sectional view taken substantially upon the plane indicated by the section line 5—5 of FIGURE 4 and shows specifically the details of a lever for actuating the individual segmental gate, the relationship of the lever with respect to the main control shaft, and the latch means carried by the lever; and FIGURE 6 is a fragmentary enlarged sectional view taken substantially upon the plane indicated by the section line 6—6 of FIGURE 5 and shows further the details of the latch means.

Figure 1:
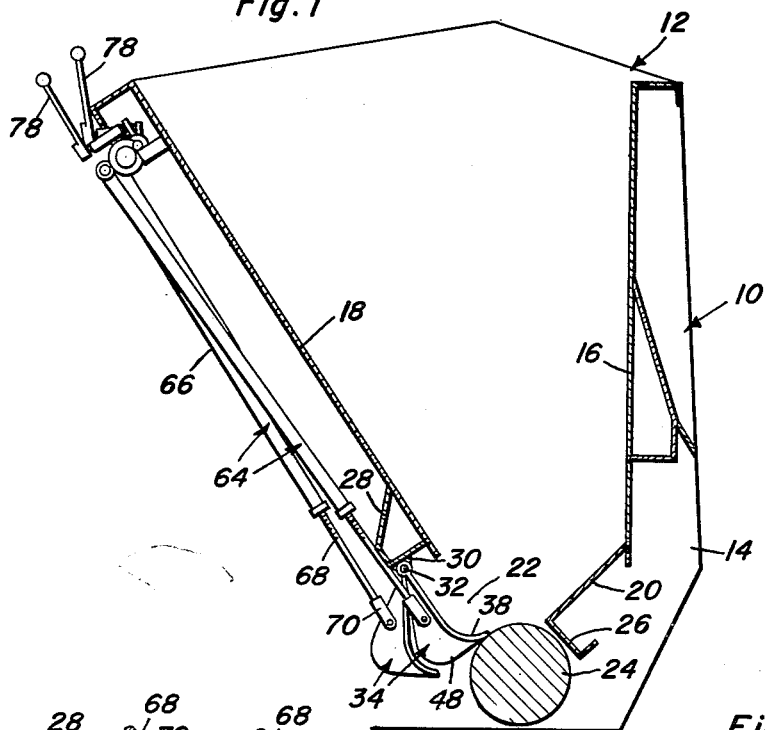
FIGURE 1 is a longitudinal sectional view through a transversely extending distributing hopper of a chip spreading machine and shows the general details of the hopper and the environment of the distributing gate which is the subject of this invention.
Figure 2:
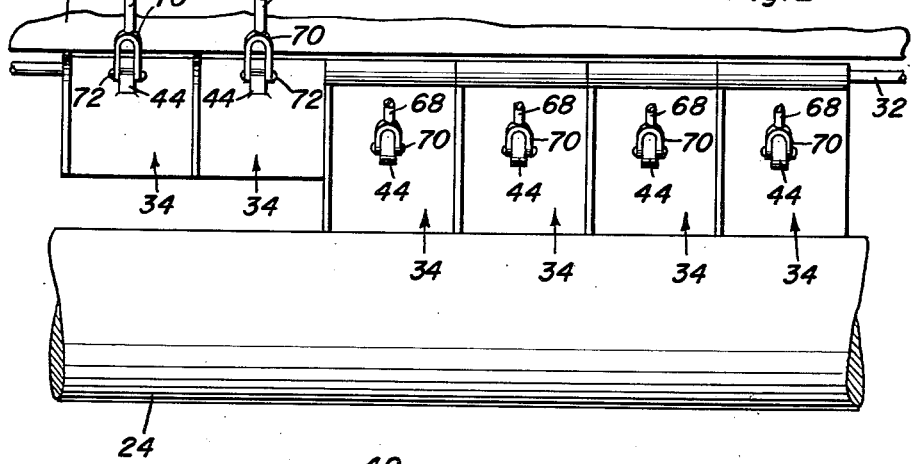
FIGURE 2 is an enlarged fragmentary elevational view of the lower part of the distributing hopper of FIGURE 1 as viewed from left to right and shows the relationship of the individual segmental gate members with respect to each other and the distributing roller.

Referring now to the drawings in detail, it will be seen that there is illustrated in FIGURE 1 a chip spreading or distributing hopper assembly which is referred to in general by the reference numeral 10. The hopper assembly 10 is a part of a chip spreading machine which is of the front discharge type. However, the principles of this invention may be applied equally as well to other types of chip spreading machines.

The hopper assembly 10 includes a hopper which is referred to in general by the reference numeral 12. The hopper 12 is formed of a pair of identical end walls 14, only one of which has been illustrated. Extending between the end walls 14 is a first transverse wall 16 which is generally vertically disposed and a second transverse wall 18 which slopes downwardly and generally towards the first transverse wall 16. Secured to the lower part of the transverse wall 16 and extending between the end walls 14 is a bottom wall 20. The bottom wall 20, together with the lower edge of the second transverse wall 18 define a discharge opening 22 which extends generally between the end walls 14.

The discharge opening 22 is partially closed by means of a distributing roll or roller 24 which is disposed adjacent a flange 26 of the bottom wall 20 and forms a partial seal therewith. The distributing roll 24 may be driven in any desired manner.

Secured to the outer lower part of the transverse wall 18 is an elongated mounting bracket 28 which extends substantially the full width of the transverse wall 18. The mounting bracket 28 is provided at intervals with hangers 30 which in turn support a transverse shaft 32. Pivotally mounted on the transverse shaft 32 is a plurality of segmental gates which are in edge abutting relation and which are referred to in general by the reference numeral 34.

Figure 3:
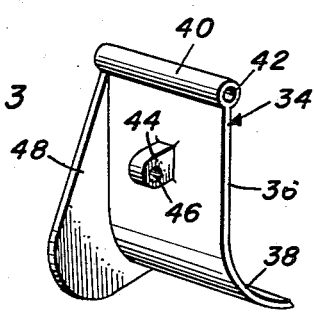
FIG. 3 is an enlarged perspective view of one of the segmental gates.

Referring now to FIGURE 3 in particular, it will be seen that each of the segmental gates 34 includes a main body portion 36 which is generally flat and which terminates at its lower end in an inwardly curved lower part 38. The body portion 36 terminates at its upper edge in a tubular part 40 having a bore 42 therethrough receiving the shaft 32. Thus the segmental gates 34 is pivotally mounted on the shaft 32.

Each of the segmental gates 34 also includes an ear 44 which extends from the outer surface of the body portion 36. The ear 44 has a transverse bore 46 therethrough. Along one edge of the segmental gate 34 is an outwardly projecting flange 48. The flange 48 is an edge flange and is disposed generally normal to the plane of the body portion 36. Furthermore, the flange 48 is of a configuration whereby the adjacent edge of an adjacent one of the segmental gates 34 will be in edge abutting relation therewith in all positions thereof. Thus when one of the segmental gates 34 is in a closed position and the next adjacent one is in an open position, a seal will be maintained between the segmental gates 34 and the escape of chips or other material being distributed therebetween will be prevented.

Referring once again to FIGURE 1 in particular, it will be seen that the curved lower part 38 of the segmental gate 34 is so shaped and so positioned whereby when the segmental gate 34 is in a closed position, the curved part 38 is disposed in a generally overlying tangential position with respect to the distributing roller 24. Thus the segmental gate 34 will form a seal with the distributing roller 24 and at the same time will permit the freedom of rotation of the distributing roller 24. Thus the distributing roller 24 may continue to rotate while certain of the segmental gates 34 are in their closed positions.

Referring now to FIGURES 4, 5 and 6 in particular, it will be seen that there are illustrated the details of the means for controlling the positions of the segmental gates 34. This means includes a main control shaft 50 which extends transversely of the hopper 12 exteriorly thereof and adjacent the transverse wall 18. The manner in which the main control shaft 50 is mounted is not a part of this invention and therefore the mounting brackets for the control shaft 50 have been eliminated for purposes of clarity. It is, however, pointed out here that the control shaft 50 is provided with an actuator (not shown) which permits the rocking of the control shaft 50 from a remote point, such as the operator's seat of the chip spreader of which the hopper assembly 10 is a part.

Mounted on the main control shaft 50 is a plurality of levers 52. Each of the levers 52 is associated with one of the segmental gates 34, there being one lever 52 for each segmental gate 34. Inasmuch as the levers 52 and the component parts connected thereto are identical, only one lever 52 will be described in detail hereinafter.

As is best shown in FIGURE 5, each lever 52 is generally rectangular in cross-section and has a large transverse bore 54 through a central part thereof receiving the main control shaft 50. The lever 52 also has an outer transverse bore 56 which is relatively small and an inner transverse bore 58 which is of an intermediate size. In addition to the transverse bores 54, 56 and 58, the lever 52 is provided with a longitudinal bore 60. The purposes of the various bores will be described in detail hereinafter.

As stated above, the main control shaft 50 passes through the transverse bore 54. Thus the lever 52 is mounted on the main control shaft 50 for rocking movement independently of the main control shaft 50.

Extending through the bore 56 is a pin 61 which pivotally connects to the lever 52 a bifurcated upper fitting 62 of a link 64. The link 64 includes an upper section 66 and a lower section 68, as is shown in FIGURE 1. The sections 66 and 68 are adjustable so as to vary the length of the link 64. The lower section 68 is provided at the lower end thereof with a bifurcated fitting 70 which is disposed on opposite sides of the ear 44 and secured to the ear 44 by means of a pin 72 which extends through the bore 46 in the ear 44.

Extending through the bore 58 is a latch pin 74. The latch pin 74 is of a length approximately equal to the width of the lever 52. Thus when the latch pin 74 is in a neutral position, it is concealed within the lever 52.

Extending through the bore 60 and projecting from opposite ends thereof is a shaft 76. The shaft 76 has secured on the outer end thereof a control lever 78. Secured on the inner end of the shaft 76 is an actuating lever 80 which terminates in a rounded finger 82. The finger 82 is seated in a slot 84 formed in the central portion of the pin 74. At this time it is pointed out that an inner portion of the lever 52 adjacent the transverse bore 58 is cut away as at 86 to provide clearance for the actuating lever 80. By swinging the control lever 78, the pin 74 may be shifted to the left or right, as viewed in FIGURES 4 and 6.

Disposed immediately adjacent the lever 52 and to the right thereof, as viewed in FIGURE 4, is a keeper 88. The keeper 88 is rigidly secured to the control shaft 50 for rotation therewith by means of a pin 90. The keeper 88 projects inwardly of the main control shaft 50 so as to have a portion thereof alined with the bore 58. In fact, the keeper 88 has a bore 92 which may be alined with the bore 58 for receiving an end portion of the latch pin 74.

Secured to the outer surface of the transverse wall 18 and projecting outwardly therefrom adjacent the lever 52 on the side thereof remote from the keeper 88 is a fixed keeper or stop member 94. The fixed keeper 94 is so positioned whereby when the latch pin 74 is projected out of the lever 52 to the left, it will overlie the keeper 94 and prevent the pivoting of the lever 52 in a clockwise direction, as viewed in FIGURE 5. Inasmuch as the lever 52 must pivot in a clockwise direction to permit the individual segmental gate 34 to swing from a closed position to an open position, it will be seen that by shifting the latch pin 74 to the left, as viewed in FIGURE 4, the individual segmental gate 34 may be latched in a closed position.

In the spreading of chips or other materials, certain of the segmental gates 34 are to be opened simultaneously. The selected segmental gates 34 are latched to the main control shaft 50. This is accomplished by shifting the lever 78 so that the latch pin 74 projects out of the lever 52 to the right, as viewed in FIGURE 4. The latch pin 74 will then enter into the bore 92 in the keeper 88 and latch the lever 52 to the main control shaft 50 for rocking or pivoting therewith. Thus all of the segmental gates 34 which are latched to the main control shaft 50 may be opened and closed or fixed in the desired positions relative to the distributing roller 24 simultaneously.

From the foregoing, it will be readily apparent that the control means for the individual segmental gates 34 is such that by merely shifting the individual control levers 78, those segmental gates 34 which it is not desired to open may be latched in a closed position and those segmental gates 34 which it is desired to open may be latched to the control shaft 50 for movement therewith. All this is accomplished by the mere shifting of the individual control levers 78. Thus this may be readily accomplished with a minimum of effort and with practically no loss of time whatsoever.

Furthermore, it will be readily apparent that there have been devised novel individual segmental gates which so cooperate with each other whereby individual ones of the gates 34 may be opened while adjacent ones thereof remain closed and there will be no escape of the chips between the adjacent segmental gates 34. Furthermore, the cooperation between the segmental gates 34, when in their closed positions, and the distributing roller 24 is such that the distributing roller 24 may continue to rotate even though certain of the segmental gates 34 are closed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and This application is a continuation of my copending application Serial No. 775,488, filed November 21, 1958, now abandoned.

I claim as my invention:

1. In a chip spreading machine, a chip spreading hopper assembly comprising a hopper having a pair of transversely extending walls and a pair of end walls interconnecting said transverse walls, a downwardly sloping bottom wall extending from one of said transverse walls and cooperating with the other of said transverse walls to define a bottom discharge opening extending generally between said end walls, a mounting bracket on the lower portion of said other transverse wall, a plurality of segmental gates disposed in edge abutting relation and extending generally between said end walls, pivot means carried by said mounting bracket supporting said segmental gates for swinging movement between open and closed positions relative to said discharge opening, each of said segmental gates having an outwardly projecting edge flange along one edge thereof to form a seal with an adjacent edge of an adjacent segmental gate when the adjacent segmental gate is in an open position.

2. In a chip spreading machine, a chip spreading hopper assembly comprising a hopper having a pair of transversely extending walls and a pair of end walls interconnecting said transverse walls, a downwardly sloping bottom wall extending from one of said transverse walls and cooperating with the other of said transverse walls to define a bottom discharge opening extending generally between said end walls, a mounting bracket on the lower portion of said other transverse wall, a plurality of segmental gates disposed in edge abutting relation and extending generally between said end walls, pivot means carried by said mounting bracket supporting said segmental gates for swinging movement between open and closed positions relative to said discharge opening, a distributing roller extending between said end walls adjacent said bottom wall and cooperating therewith to partially close said discharge opening, said segmental gates being engaged with said distributing roller when in their closed positions, each of said segmental gates having an outwardly projecting edge flange along one edge thereof to form a seal with an adjacent edge of an adjacent segmental gate when the adjacent segmental gate is in an open position.

3. In a chip spreading machine, a chip spreading hopper assembly comprising a hopper having a pair of transversely extending walls and a pair of end walls interconnecting said transverse walls, a downwardly sloping bottom wall extending from one of said transverse walls and cooperating with the other of said transverse walls to define a bottom discharge opening extending generally between said end walls, a mounting bracket on the lower portion of said other transverse wall, a plurality of segmental gates disposed in edge abutting relation and extending generally between said end walls, pivot means carried by said mounting bracket supporting said segmental gates for swinging movement between open and closed positions relative to said discharge opening, a distributing roller extending between said end walls adjacent said bottom wall and cooperating therewith to partially close said discharge opening, said segmental gates each having an inwardly curved lower part engaging said distributing roller in an overlying tangential relation when said segmental gates are in their closed positions, each of said segmental gates having an outwardly projecting edge flange along one edge thereof to form a seal with an adjacent edge of an adjacent segmental gate when the adjacent segmental gate is in an open position.

4. In a chip spreading machine, a chip spreading hopper assembly comprising a hopper having a pair of transversely extending walls and a pair of end walls interconnecting said transverse walls, a downwardly sloping bottom wall extending from one of said transverse walls and cooperating with the other of said transverse walls to define a bottom discharge opening extending generally between said end walls, a mounting bracket on the lower portion of said other transverse wall, a plurality of segmental gates disposed in edge abutting relation and extending generally between said end walls, pivot means carried by said mounting bracket supporting said segmental gates for swinging movement between open and closed positions relative to said discharge opening, and control means carried by said other transverse wall and connected to said segmental gates for positioning said segmental gates, said control means including a transversely extending main control shaft, a lever for each of said segmental gates pivotally mounted on said main control shaft, a link connecting each of said levers to its respective segmental gate, and latch means releasably connecting each of said levers to said main control shaft for rotation therewith, said latch means including a keeper secured to said main control shaft and a shiftable latch pin carried by said lever.

5. In a chip spreading machine, a hopper assembly including a hopper having an elongated discharge opening formed in the bottom thereof, a plurality of segmental gates disposed in edge abutting relation and extending along said opening, pivot means secured to said hopper supporting said segmental gates for swinging movement between open and closed positions relative to said discharge opening, each of said segmental gates having an outwardly projecting edge flange along at least one edge thereof to form a seal with an adjacent edge of an adjacent segmental gate when the adjacent segmental gate is in an open position.

6. In a chip spreading machine, a hopper assembly including a hopper having an elongated discharge opening formed in the bottom thereof, a plurality of segmental gates disposed in edge abutting relation and extending along said opening, pivot means secured to said hopper supporting said segmental gates for swinging movement between open and closed positions relative to said discharge opening, and control means carried by said hopper and connected to said segmental gates for positioning said segmental gates, said control means including a transversely extending main control shaft, a lever for each of said segmental gates pivotally mounted on said main control shaft, a link connecting each of said levers to its respective segmental gate, and lock means for selectively locking each of said levers to said main control shaft for rotation therewith.

7. In a chip spreading machine, a hopper assembly including a hopper having an elongated discharge opening formed in the bottom thereof, a plurality of segmental gates disposed in edge abutting relation and extending along said opening, pivot means secured to said hopper supporting said segmental gates for swinging movement between open and closed positions relative to said discharge opening, and control means carried by said hopper and connected to said segmental gates for positioning said segmental gates, said control means including a transversely extending main control shaft, a lever for each of said segmental gates pivotally mounted on said main control shaft, a link connecting each of said levers to its respective segmental gate, and lock means for selectively locking each of said levers to said main control shaft for rotation therewith, said lock means including a keeper secured to said main control shaft and a shiftable pin carried by said lever, and a fixed keeper carried by said hopper engageable by said pin for locking each segmental gate in its closed position.

8. In a chip spreading machine, the combination comprising a hopper assembly including a hopper having an elongated discharge opening formed in the bottom thereof; a rotatable distributing roller extending lengthwise of said discharge opening and positioned to partially close said discharge opening; a plurality of segmental gates pivotally mounted on said hopper assembly in edge abutting relation for independent swinging movement into said discharge opening to further close said opening, each of said gates having an inwardly curved lower part curved in opposition to the direction of rotation of the roller which is movable into a generally overlying tangential position with respect to said roller to form a seal with said roller and at the same time slidably engages said gates with said roller so that it may continue to rotate while the gates are in closed positions.

9. In a machine for spreading mineral chips or the like or roadways in swaths of various widths, the combination comprising a hopper having an elongated discharge opening formed in the bottom thereof; a distributing roller extending lengthwise of said discharge opening and positioned to partially close said opening; a plurality of independently movable segmental gates pivotally mounted in edge abutting relation for movement between open and closed positions with respect to said roller, each of said gates having a portion which is movable into a generally overlying tangential position with respect to said roller to form a chip retaining seal with said roller and at the same time slidably engages said gates with said roller so that it may continue to rotate while the gates are in closed position; and means for controllably moving certain of said gates between closed and open positions, including means for locking the remaining gates in closed position when said certain of said gates are open to vary the width of the swath.

References Cited in the file of this patent

UNITED STATES PATENTS

| | | |
|---|---|---|
| 1,673,465 | McLaughlin et al. | June 12, 1928 |
| 2,159,554 | George | May 23, 1939 |
| 2,777,700 | Valantin | Jan. 15, 1957 |